United States Patent
Nariani-Schulze et al.

(10) Patent No.: US 9,686,470 B2
(45) Date of Patent: Jun. 20, 2017

(54) SCENE STABILITY DETECTION

(71) Applicant: Apple Inc., Cupertino, CA (US)

(72) Inventors: Anita Nariani-Schulze, Los Altos, CA (US); Benjamin M. Olson, Sunnyvale, CA (US); Ralph Brunner, Cupertino, CA (US); Suk Hwan Lim, Mountain View, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/502,128

(22) Filed: Sep. 30, 2014

(65) Prior Publication Data

US 2015/0350547 A1 Dec. 3, 2015

Related U.S. Application Data

(60) Provisional application No. 62/005,884, filed on May 30, 2014.

(51) Int. Cl.
*H04N 5/232* (2006.01)
*G06T 7/215* (2017.01)

(52) U.S. Cl.
CPC ......... *H04N 5/23254* (2013.01); *G06T 7/215* (2017.01); *G06T 2207/20016* (2013.01); *G06T 2207/20076* (2013.01); *G06T 2207/20104* (2013.01)

(58) Field of Classification Search
USPC ....................................... 348/208.6; 382/232
See application file for complete search history.

(56) References Cited

U.S. PATENT DOCUMENTS

| | | | |
|---|---|---|---|
| 7,542,614 B2* | 6/2009 | Silverstein | ........... H04N 5/2353 382/232 |
| 8,190,016 B2 | 5/2012 | Pozniansky | |
| 8,351,773 B2 | 1/2013 | Nasiri | |
| 8,558,913 B2 | 10/2013 | Pillman | |
| 2002/0149674 A1 | 10/2002 | Mathews | |
| 2012/0224759 A1* | 9/2012 | Masui | .................... A61B 8/085 382/131 |

\* cited by examiner

*Primary Examiner* — Joel Fosselman
(74) *Attorney, Agent, or Firm* — Blank Rome LLP

(57) ABSTRACT

Techniques to detect subject and camera motion in a set of consecutively captured image frames are disclosed. More particularly, techniques disclosed herein temporally track two sets of downscaled images to detect motion. One set may contain higher resolution and the other set lower resolution of the same images. For each set, a coefficient of variation may be computed across the set of images for each sample in the downscaled image to detect motion and generate a change mask. The information in the change mask can be used for various applications, including determining how to capture a next image in the sequence.

20 Claims, 4 Drawing Sheets

SCENE STABILITY DETECTION

BACKGROUND

Taking high quality photographs in lower ambient light, or photographing dynamic scenes (e.g., sport scenes) can be challenging due to camera and/or scene object motion during an image's exposure time. The general class of techniques directed to reducing the blur associated with camera motion may be referred to as "image stabilization." In practice, image stabilization's primary goal is to reduce camera shake caused by the photographer's inability to stop their hand motion during image capture. Image stabilization may be used in binoculars, still and video cameras and astronomical telescopes. In still cameras, camera shake can be particularly problematic at slow shutter speeds or with long focal length (telephoto) lenses. With video cameras, camera shake can cause visible frame-to-frame jitter in the recorded video. In astronomical settings, the problem of lens-shake can be added to by variations in the atmosphere over time, which can cause the apparent positions of objects to change. Camera stabilization may be provided, for example, by mounting the camera to a stationary platform (e.g., a tripod) or by specialized image capture hardware. Devices employing the latter are generally referred to as having Optical Image Stabilization (OIS). Ideally, camera stabilization compensates for all camera motion to produce an image in which the scene's static background is sharp even when captured with a long exposure time.

Even when 100% accurate, camera stabilization does not detect or compensate for scene object motion. In particular, during long exposure times objects in a scene can move significantly making the final image look unnatural (i.e., sharp background with blur trails due to moving objects). Even if the moving objects are not moving significantly (e.g., faces in a portrait scene), their motion may still result in a visible blur when the exposure time is longer than, for example, ½ second or ¼ second.

SUMMARY

In one embodiment, a non-transitory program storage device, readable by a programmable control device and comprising instructions stored thereon to cause the programmable control device perform a set of operations is provided. The instructions stored may cause the programmable control device to obtain a set of two or more image frames in an image sequence, downscale each of the obtained image frames in the set, calculate a coefficient of variation for each sample in a last received image frame in the set, the coefficient of variation being calculated across each of the images in the set, and detect motion in the last image frame by comparing each of the calculated coefficients of variation to a threshold value.

In another embodiment, an electronic device is provided which comprises an image capture unit, a memory operatively coupled to the image capture unit, and one or more processors operatively coupled to the memory and configured to execute instructions stored in the memory. The instructions are configured to cause the one or more processors to capture, by the image capture unit, a set of two or more consecutively captured images, store the set of images in the memory, downscale each of the obtained image frames in the set, calculate a coefficient of variation for each sample in a last received image frame in the set, the coefficient of variation being calculated across each of the images in the set, and detect motion in the last image frame by comparing the coefficients of variation to a threshold value.

In yet another embodiment, a method is provided. The method includes obtaining a set of two or more image frames in an image sequence, downscaling each of the obtained image frames in the set, calculating a coefficient of variation for each sample in a last received image frame in the set, the coefficient of variation being calculated across each of the images in the set, and detecting motion in the last image frame by comparing the coefficients of variation to a threshold value.

DETAILED DESCRIPTION

Figure 1:
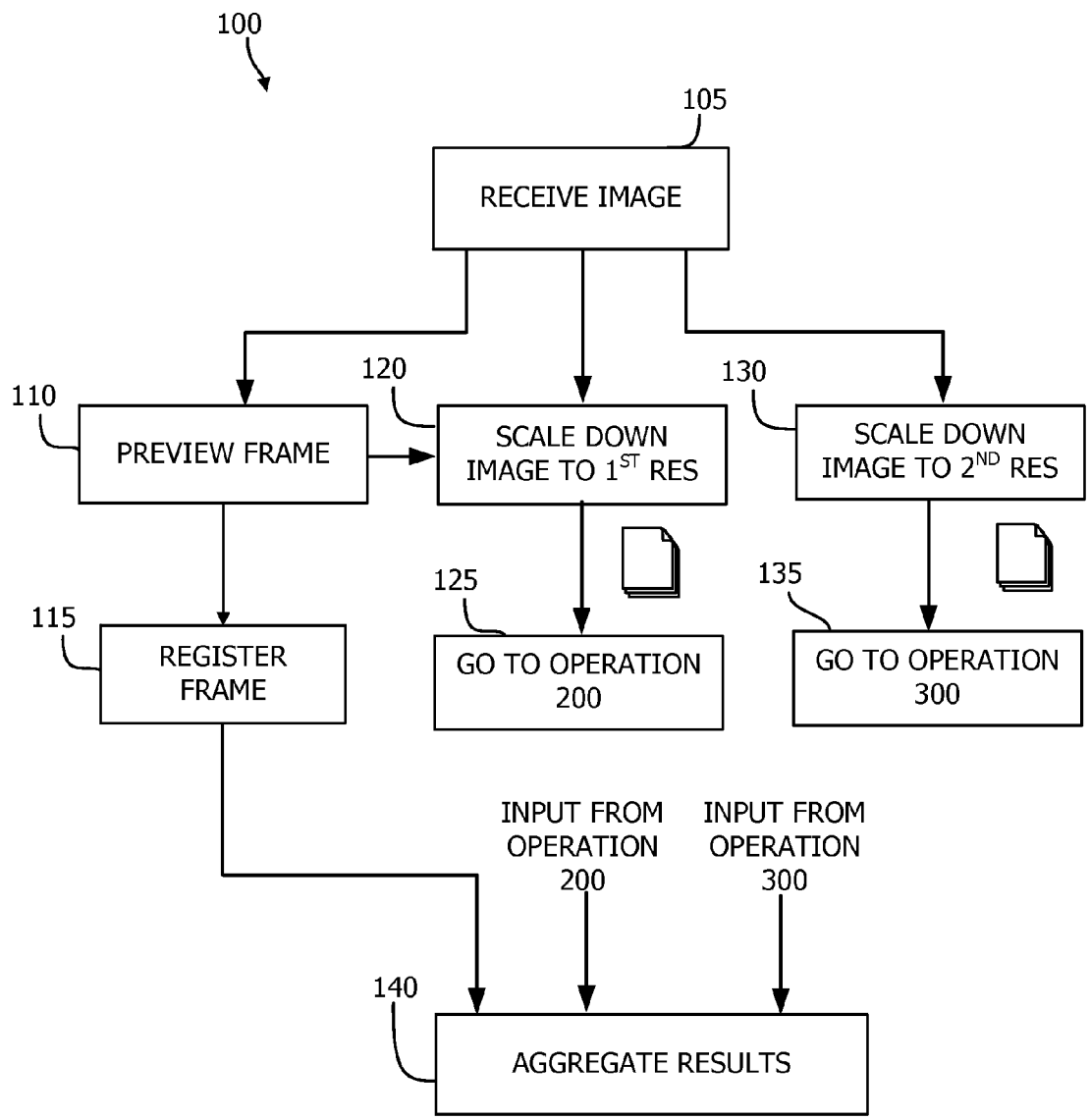
FIG. 1 shows, in flow chart form, an image detection operation in accordance with one embodiment.

This disclosure pertains to systems, methods, and computer readable media to detect motion in images captured by an image capture device. In general, techniques are disclosed for detecting both camera and scene motion and identifying areas of the image that contain such motion. More particularly, techniques disclosed herein temporally track two sets of downscaled images to detect motion. One set may contain higher resolution and the other set lower resolution versions of the same sequence of images. For each set, each of the downscaled images may be exposure normalized based on integration of time and gain. For each set, a coefficient of variation may also be computed across the set of images for each sample in the last downscaled image in the image sequence. The coefficients of variation can then be compared against a threshold value to generate a change mask that indicates areas of the image where scene motion is present. The information in the change mask can be used for various applications, including determining how to capture a next image in the sequence. For example, in the presence of motion, the next image may be exposed for a shorter duration of time, whereas in the absence of motion, the next image capture can be a longer duration exposure.

In the following description, for purposes of explanation, numerous specific details are set forth in order to provide a thorough understanding of the inventive concept. As part of this description, some of this disclosure's drawings represent structures and devices in block diagram or flow chart form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Taking high quality photographs in lower ambient light, or photographing dynamic scenes can be challenging due to camera and/or scene objects motions during the exposure time. Without taking into account scene information, an optimal static capture scheme may be used such that at a particular light level, a particular integration time and gain are used to capture the image. One way this is achieved is, for example, by shortening the exposure time for low light. A shorter exposure time, however, may reduce the motion blur artifacts at the expense of a noisier and/or darker image. This may result in minimal blur for scenes having object motion, but may also create scene containing considerable noise in scenes with no object motion, such as a night landscape. This is because currently used capture schemes do not take into account dynamics in the actual scene.

If scene motion information was available, amplifying noise in static scenes could be prevented by capturing longer exposure images when there is no subject motion in the scene. Information about scene or subject motion could also be used to optimize fusion of long and short exposure images, based on an assumption that subject motion in image frames preceding the currently captured frame correlate to subject motion in the current frame. Thus detection of scene motion information can be highly valuable in image stabilization.

Referring to FIG. 1, operation 100 in accordance with one embodiment begins when an image frame is received (block 105). In one embodiment, the image is received from an image signal processor (ISP). In general, image frames are captured and received in sequence with a number of previously received frames being buffered in memory for use in processing of future images. Thus even though only one image frame may be received at a given time, the received framed may be processed with a predetermined number (N) of previously received and buffered images in the image sequence as a set. In one embodiment, the image sensor capturing the image frame may be in a streaming mode and each image frame maybe rendered to a device display for still image preview. The still image preview may be of a smaller size than the original image. As such this may be the image that is analyzed to determine scene information.

The currently received image may first be previewed (block 110) and the image along with the one image immediately preceding it may be sent to block 115 for registration. The step may include globally registering the two adjacent image frames by registering row and column sums of the two frames. In one embodiment, this may involve pixel sum global registration translation in the X and Y directions. The registration process may detect whether the scene is changing, as it can generally detect camera handshake and significant subject movements in the scene. Less obvious subject movements, however, such as a person nodding their head or a Ferris wheel turning may sometimes not be detected by the registration method. To detect such motion, operation 100 includes more processing of the image.

In one embodiment, to conduct further processing, the currently received image may first be downscaled to a first resolution (block 120). If the other image frames in the buffered image set have not been downscaled to the first resolution, those frames may also be downscaled to the first resolution at this point. The downscaled image along with the predetermined number (N) of images preceding it in the sequence (i.e., N+1 downscaled images) may then be sent to operation 200 for further processing (block 125). Similarly, the received image may be downscaled to a second resolution (block 130) for further processing by operation 300 and the downscaled second resolution image frame along with a predetermined number (N) of image frames preceding it in the sequence (i.e., N+1 downscaled images) may be sent to operation 300 for further processing (block 135). The predetermined number N may be a number of images determined to be useful for processing to detect motion. For example, seven images received immediately prior to the current image in the image sequence may be used in one embodiment for a total of eight (7+1) images. In one embodiment, the first resolution is a lower resolution compared to the second resolution. For example, block 120 may downscale the image to 16×16 tiles, whereas operation 130 may downscales the image to 51×51 tiles. In one embodiment, the step of downscaling the image to the first resolution may be eliminated by using a downscaled image provided by the hardware. The downscaled images, in one embodiment, may be a luminance image.

Figure 2:
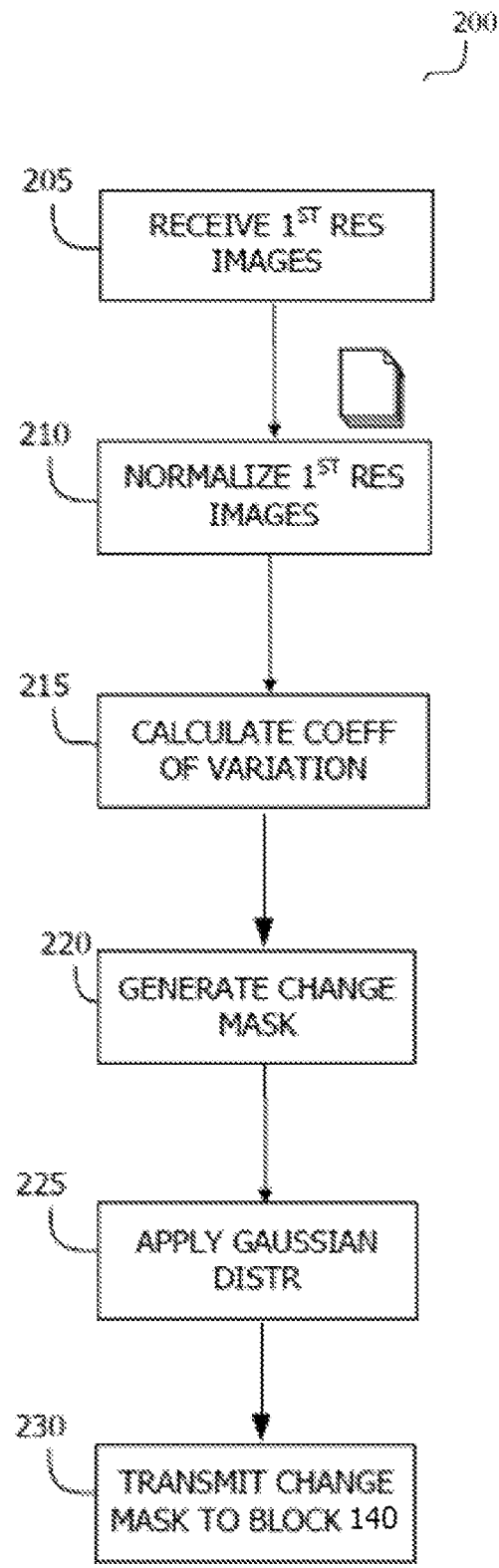
FIG. 2 shows, in flow chart form, an image detection operation for a first resolution set of images in accordance with one embodiment.

Referring to FIG. 2, motion detection operation 200 in accordance with one embodiment begins when a set of first resolution images are received (block 205) for processing. It should be noted that all of the image frames in the image set being received have generally been downscaled to the same first resolution prior to being sent to operation 200. However, operation 200 is performed to detect motion in the last received image frame, not the N images immediately preceding it. Thus, N+1 number of first resolution downscaled images in the image sequence may be used to perform the steps of operation 200 to detect motion in the latest received image frame. The received images may each be exposure normalized based on exposure time and gain for each image (block 210). This is done because since previous images are being used, lighting may have changed, resulting in the images having different exposure time and gain. Exposure normalization allows each frame to be normalized by its exposure time and gain, thus allowing these frames to be compared on the same scale.

Once the images in the image set have been exposure normalized, a coefficient of variation may be calculated for each pixel in the current image across all the images in the set (i.e., across the N+1 images) (block 215). The coefficient of variation may be computed on each pixel value of output of block 120. In one embodiment, the coefficient of variation may be a standard linear coefficient that illustrates changes in the image sequence. In this manner, every sample or tile in the downscaled image may be temporally tracked. In one embodiment, the coefficients of variation may show how brightness changes over time. In this manner, motion may be detected by identifying changes in the temporal direction.

Once the coefficients of variation have been calculated for the current image, motion may be detected by applying a threshold value to each coefficient of variation. The threshold may be a predetermined value above which motion is determined to be present. As such, by comparing the coefficient of variation to the threshold value, a decision may be made as to whether the sample for which the coefficient of variation was calculated indicates motion. In one embodiment, a change mask may be generated based on this comparison (block 220). For example, the values above the specified threshold may be set to a "1," to indicate change or motion while values below or equal to the specified threshold may be set to a "0" to indicate no motion. Threshold selection may, for example, be based on an a priori noise model.

Once the change mask is generated, it may be center weighted using a Gaussian distribution to mark the center of the image frame as the region of interest (block 225). This allows for any small subject movement in the background to have less weighting than the main region of interest. In one embodiment, areas of interest in the image may be detected and those areas may be used as the center weights. If more than one area of interest is detected, in one embodiment, a class system may be created to designate the areas of interest in the order of their importance. In another embodiment, areas of interest may be specified by the photographer by selecting a region to focus the lens on, or selecting a region for an auto exposure algorithm to target. The weighted change mask may then be returned to block 140 of operation 100 for further processing (block 230).

Figure 3:
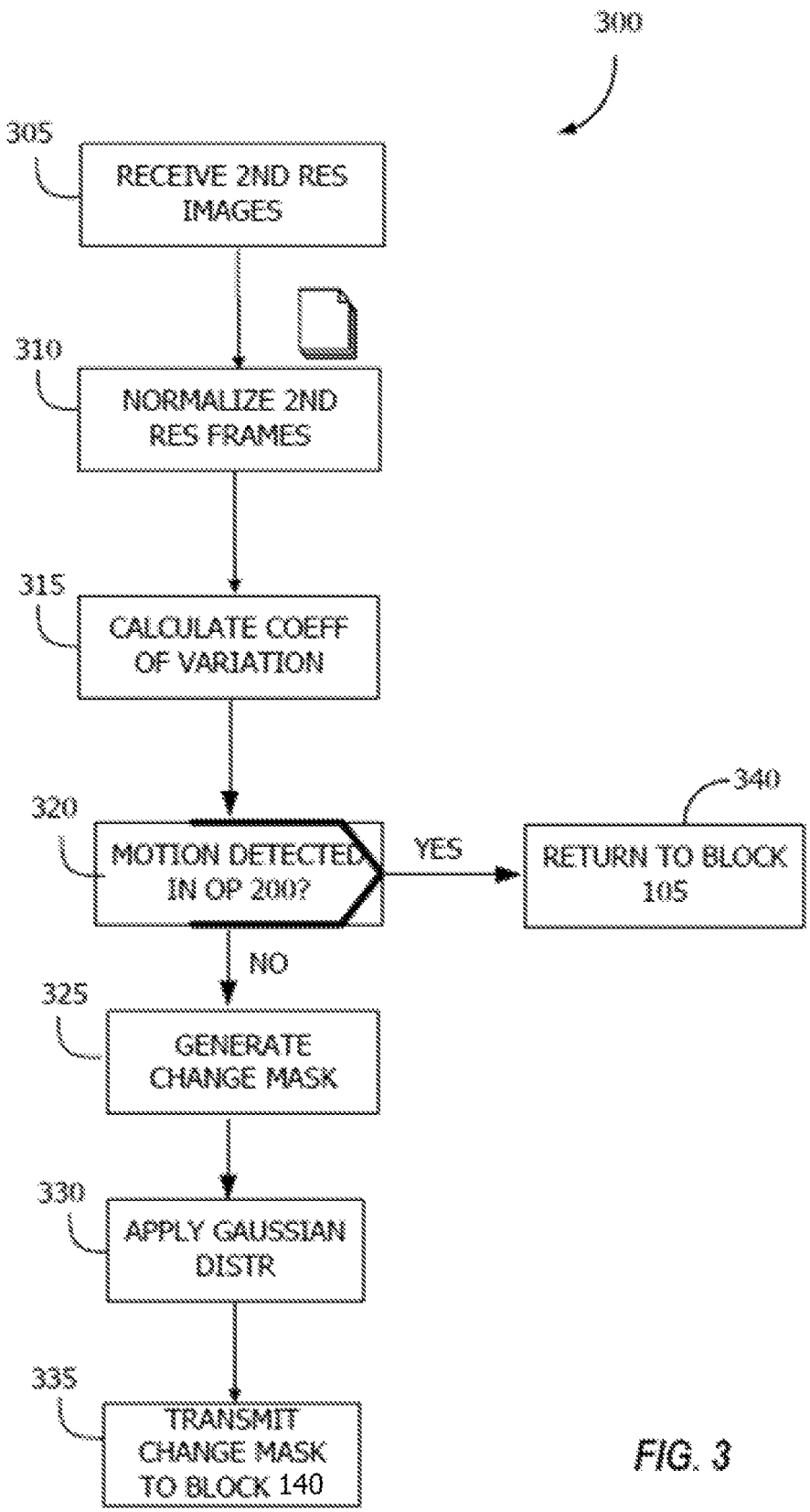
FIG. 3 shows, in flow chart form, an image detection operation for a second resolution set of images in accordance with one embodiment.

Referring to FIG. 3, motion detection operation 300 in accordance with one embodiment begins when a set of second resolution images are received (block 305) for processing. It should be noted that the all of the images in the image sequence being received have generally been downscaled to the same second resolution prior to being sent to operation 300. However, operation 300 is performed to detect motion in the latest received image frame, not the N image frames immediately preceding it. It should also be noted that most of the steps of operation 300 are similar to those of operation 200, but they are performed on the second set of image frames which contains a higher resolution version of the first set of image frames processed in operation 200. As such, similar to images in the operation 200, the received image frames may first be exposure normalized based on exposure time and gain for each image (block 310).

Once the images in the set have been exposure normalized, a coefficient of variation may be calculated for each sample (i.e., each tile) in the current image across all the images in the set (i.e., across the N+1 images) (block 315) to detect changes in the temporal direction.

Once the coefficients of variation have been calculated for the current image, operation 300 may determine if motion was detected in the change mask generated by operation 200 (block 320). When motion was detected by operation 200, the operation 300 may simply return to block 105 of operation 100 (block 340) to receive the next image frame without performing any further processing on the current image frame. That is because once motion is detected on the lower resolution image, the information needed to decide whether the next image frame should be captured with long exposure or short exposure and how to combine long and short exposure images by image fusion may already be available. Thus it may be more efficient to conserve resources by simply waiting till the next image frame is arrived. In one embodiment, the entire operation 300 may not start until it is determined that no motion is detected by operation 200. Alternatively, the processing of the image frame during operation 300 may be performed regardless of whether or not motion is detected during operation 200.

When motion is not detected during operation 200, the process moves to compare the coefficients of variation calculated (block 315) to a threshold value and generate a change mask based on the comparison (block 325). Again, the threshold may be a predetermined value above which presence of motion is indicated. As such by comparing the coefficients of variation to the threshold value, a decision may be made as to whether the sample for which the coefficient of variation was calculated indicates motion. A Gaussian distribution may then be applied to the change mask to center the change mask on area(s) of interest (block 330). The resulted change mask may then be sent to block 140 of operation 100 for further processing (block 335).

Referring back to FIG. 1, the change masks of operation 200 and operation 300 may be compared and aggregated with the results of the registration step of block 115 to detect presence of camera and subject motion. The results may then be used for various applications, including determining at what exposure to capture the next image in the sequence, to determine the capture sequence, or to optimize the fusion process using the motion information.

Figure 4:
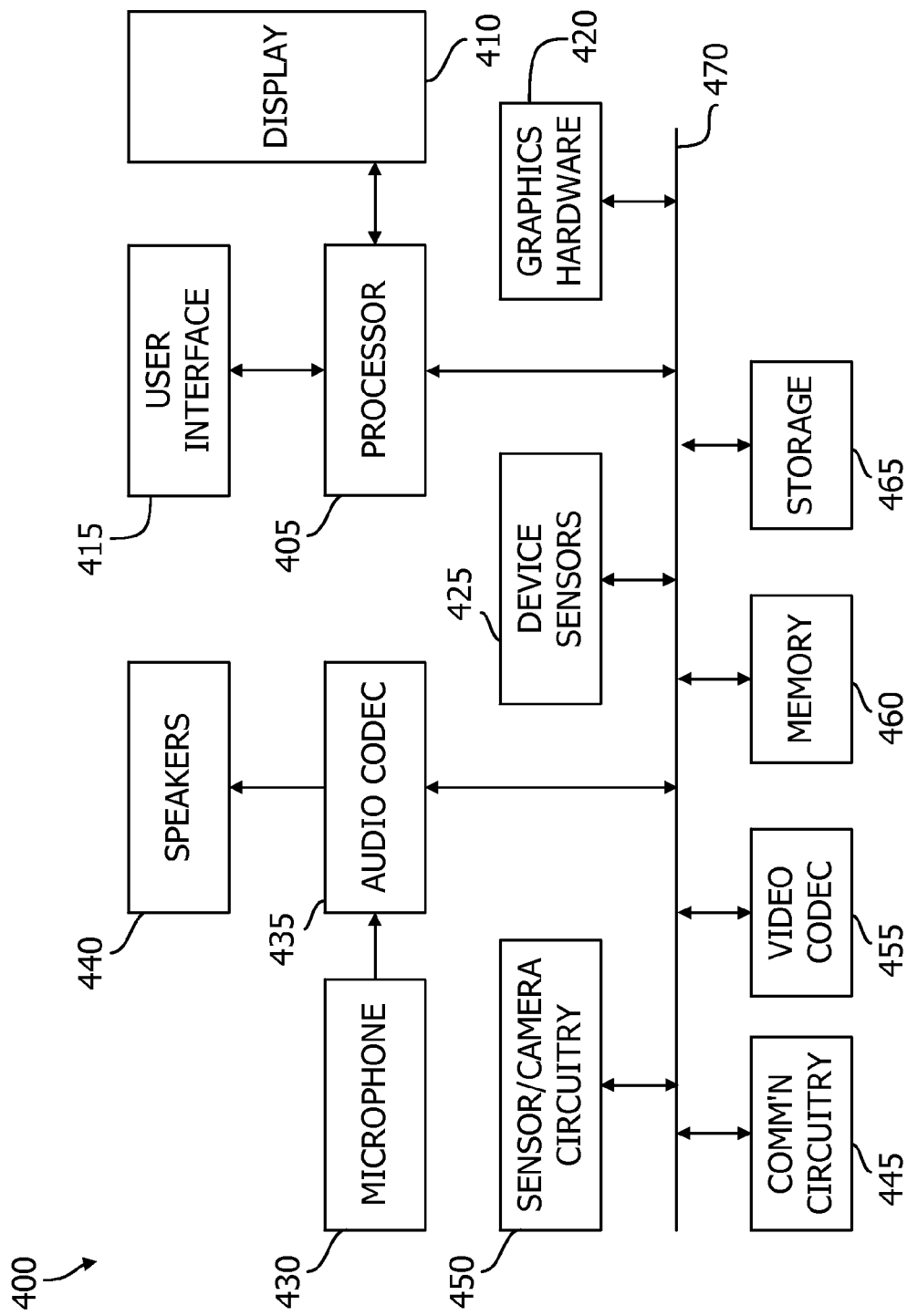
FIG. 4 shows, in block diagram form, a multi-function electronic device in accordance with one embodiment.

Referring to FIG. 4, a simplified functional block diagram of illustrative electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture circuit or unit 450, video codec(s) 455, memory 460, storage 465, and communications bus 470. Processor 405 may execute instructions necessary to carry out or control the operation of many functions performed by device 400 (e.g., such as the generation and/or processing of images in accordance with FIGS. 1-3). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view the result of image sequencing or fusion in accordance with this disclosure. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs). Image capture circuitry 450 may capture still and video images that may be processed to generate image scene motion information in accordance with this disclosure. Output from image capture circuitry 450 may be processed, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405, graphics hardware 420, and image capture circuitry 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405 such computer program code may implement one or more of the methods described herein. It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, FIGS. 1, 2 and 3 show flowcharts illustrating various aspects in accordance with the disclosed embodiments. In one or more embodiments, one or more of the illustrated steps may be omitted, repeated, and/or performed in a different order. Accordingly, the specific arrangement of steps shown in these figures should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
   obtain a set of two or more image frames in an image sequence;
   downscale each of the obtained image frames in the set in its entirety, thereby generating a first downscaled version of each image frame, wherein the first downscaled version of each image frame consists of a first plurality of samples;
   calculate a coefficient of variation for each of the first plurality of samples in the first downscaled version of a last received image frame in the set, wherein the coefficient of variation for each sample in the first downscaled version of the last received image frame in the set is calculated based, at least in part, on the corresponding sample in the first downscaled version of each of the other image frames in the set; and
   detect motion in the last image frame in the set by comparing each of the calculated coefficients of variation in the first downscaled version of the last received image frame in the set to a threshold value.

2. The non-transitory program storage device of claim 1, wherein the instructions to detect motion in the last image frame comprise instructions to cause the programmable control device to generate a change mask based on determining if each coefficient of variation exceeds the threshold value.

3. The non-transitory program storage device of claim 2, further comprising instructions stored thereon to cause the programmable control device to apply a Gaussian distribution to the change mask.

4. The non-transitory program storage device of claim 3, wherein the Gaussian distribution is applied to one or more areas of interest in the last received image frame.

5. The non-transitory program storage device of claim 1, further comprising instructions stored thereon to cause the programmable control device to cause the programmable control device to exposure normalize each image frame in the set.

6. The non-transitory program storage device of claim 1, further comprising instructions stored thereon to cause the programmable control device to cause the programmable control device to:
   perform a second downscaling operation on each of the obtained image frames in its entirety, thereby generating a second downscaled version of each image frame, wherein the second downscaled version of each image frame consists of a second plurality of samples, and wherein the second plurality of samples is a larger number than the first plurality of samples; and
   calculate a coefficient of variation for each of the second plurality of samples in the second downscaled version of the last received image frame in the set, wherein the coefficient of variation for each sample in the second downscaled version of the last received image frame in the set is calculated based, at least in part, on the corresponding sample in the second downscaled version of each of the other image frames in the set.

7. The non-transitory program storage device of claim 6, further comprising instructions stored thereon to cause the programmable control device to cause the programmable control device to:
   detect motion in the last image frame in the set by comparing each of the calculated coefficients of variation in the second downscaled version of the last received image frame in the set to a threshold value when no motion is detected by comparing the calculated coefficients of variation in the first downscaled version of the last received image frame in the set.

8. The non-transitory program storage device of claim 6, further comprising instructions stored thereon to cause the programmable control device to: exposure normalize the first downscaled version of each image frame in the set; and exposure normalize the second downscaled version of each image frame in the set.

9. An electronic device, comprising:
   an image capture unit;
   a memory operatively coupled to the image capture unit; and
   one or more processors operatively coupled to the memory and configured to execute instructions stored in the memory, the instructions configured to cause the one or more processors to:
   capture, by the image capture unit, a set of two or more consecutively captured images;
   store the set of images in the memory;
   downscale each of the captured images in the set in its entirety, thereby generating a first downscaled version of each image, wherein the first downscaled version of each image consists of a first plurality of samples;
   calculate a coefficient of variation for each of the first plurality of samples in the first downscaled version of a last received image in the set, the coefficient of variation for each sample in the first downscaled version of the last received image in the set is calculated based, at least in part, on the corresponding sample in the first downscaled version of each of the other images in the set; and detect motion in the last image in the set by comparing the coefficients of variation in the first downscaled version of the last received image in the set to a threshold value.

10. The electronic device of claim 9, wherein the instructions to detect motion in the last image comprise instructions to cause the one or more processors to:

generate a change mask based on determining if each coefficient of variation exceeds the threshold value.

11. The electronic device of claim 10, further comprising instructions to cause the one or more processors to apply a Gaussian distribution to the change mask.

12. The electronic device of claim 9, further comprising instructions to cause the one or more processors to exposure normalize each image in the set.

13. The electronic device of claim 9, further comprising instructions to cause the one or more processors to:

perform a second downscaling operation on each of the obtained images in its entirety, thereby generating a second downscaled version of each image, wherein the second downscaled version of each image consists of a second plurality of samples, and wherein the second plurality of samples is a larger number than the first plurality of samples; and calculate a coefficient of variation for each of the second plurality of samples in the second downscaled version of the last received image in the set, wherein the coefficient of variation for each sample in the second downscaled version of the last received image in the set is calculated based, at least in part, on the corresponding sample in the second downscaled version of each of the other images in the set.

14. The electronic device of claim 13, further comprising instructions to cause the one or more processors to:

detect motion in the last image in the set by comparing each of the calculated coefficients of variation in the second downscaled version of the last received image in the set to a threshold value when no motion is detected by comparing the calculated coefficients of variation in the first downscaled version of the last received image in the set.

15. The electronic device of claim 14, further comprising instructions to cause the one or more processors to register the last image in the set of captured images with an image preceding it in the image sequence.

16. The electronic device of claim 14, further comprising instructions to cause the one or more processors to: exposure normalize the first downscaled version of each image in the set; and exposure normalize the second downscaled version of each image in the set.

17. A method comprising:

obtaining a set of two or more image frames in an image sequence;

downscaling each of the obtained image frames in the set in its entirety, thereby generating a first downscaled version of each image frame, wherein the first downscaled version of each image frame consists of a first plurality of samples;

calculating a coefficient of variation for each of the first plurality of samples in the first downscaled version of a last received image frame in the set, wherein the coefficient of variation for each sample in the first downscaled version of the last received image frame in the set is calculated based, at least in part, on the corresponding sample in the first downscaled version of each of the other image frame in the set; and detecting motion in the last image frame in the set by comparing each of the calculated coefficients of variation in the first downscaled version of the last received image frame in the set to a threshold value.

18. The method of claim 17, further comprising:

generating a change mask based on determining if each coefficient of variation exceeds the threshold value.

19. The method of claim 18, further comprising applying a Gaussian distribution to the change mask.

20. The method of claim 17, further comprising fusing two or more of the image frames in the set together based, at least in part, on the detected motion.

* * * * *